United States Patent
Thronicke et al.

(10) Patent No.: US 12,094,465 B2
(45) Date of Patent: Sep. 17, 2024

(54) METHOD, COMPUTER PROGRAM, DEVICE FOR VIRTUALLY ASSISTING A USER WITH A DIGITAL ASSISTANT

(71) Applicant: ATOS FRANCE, Bezons (FR)

(72) Inventors: Wolfgang Thronicke, Salzkotten (DE); Patrick Johns, Dusseldorf (DE)

(73) Assignee: ATOS FRANCE, Bezons (FR)

( * ) Notice: Subject to any disclaimer, the term of this patent is extended or adjusted under 35 U.S.C. 154(b) by 294 days.

(21) Appl. No.: 17/572,957

(22) Filed: Jan. 11, 2022

(65) Prior Publication Data

US 2022/0223148 A1    Jul. 14, 2022

(30) Foreign Application Priority Data

Jan. 12, 2021 (EP) .................................... 21151217

(51) Int. Cl.
*G10L 15/22* (2006.01)
(52) U.S. Cl.
CPC ........ *G10L 15/22* (2013.01); *G10L 2015/223* (2013.01)
(58) Field of Classification Search
CPC ........................ G10L 15/22; G10L 2015/223
USPC ................................ 704/231, 246, 251–252
See application file for complete search history.

(56) References Cited

U.S. PATENT DOCUMENTS

| 11,086,858 | B1* | 8/2021 | Koukoumidis | ........... H04L 5/02 |
| 2019/0130904 | A1* | 5/2019 | Homma | .................. G10L 15/18 |

FOREIGN PATENT DOCUMENTS

WO    2016149231 A1    9/2016

OTHER PUBLICATIONS

Extended European Search Report issued in EP21151217.3, dated Jun. 16, 2021 (7 pages).

* cited by examiner

*Primary Examiner* — George C Monikang
(74) *Attorney, Agent, or Firm* — ARC IP Law, PC; Joseph J. Mayo

(57) ABSTRACT

The invention relates to a computer-implemented method for virtually assisting a user with a digital assistant comprising at least one iteration of a step, called an assisting step, comprising receiving a user input, predicting at least one potential action corresponding to the user input, and confirming one of the at least one potential action as a correct action corresponding to the user input. The method includes a prefetching step, the prefetching step including triggering execution of the at least one potential action before the confirmation step, such that, if the at least one potential action corresponds to the correct action, a response time to the user input is shortened.

10 Claims, 2 Drawing Sheets

METHOD, COMPUTER PROGRAM, DEVICE FOR VIRTUALLY ASSISTING A USER WITH A DIGITAL ASSISTANT

This application claims foreign priority to European Patent Application No. 21151217.3 filed on Jan. 12, 2021, the specification of which is hereby incorporated herein by reference.

BACKGROUND

Field of the Invention

The present invention relates to a method, a computer program and a device for assisting a user with a digital assistant, also called virtual assistant. The invention further relates to a digital assistant implementing such a method.

The field of the invention is the field of the digital assistants, also called virtual assistants.

Description of the Related Art

Digital assistants are well known and become more and more used. A digital assistant may be a standalone apparatus with no other function than virtually assisting a user, or may be integrated in an equipment such as a car, a loudspeaker, a smartphone, a watch, etc.

The main purpose of a digital assistant is to listen to and execute a user's request by responding to the user through an audible signal or by sending communication signal to another apparatus.

For an acceptable conversation with a digital assistant the pause between a user interaction and the assistant's answer must not exceed a certain threshold. While this can be achieved in settings with lower complexity and limited backend-interaction, this becomes a challenge if the assistant has to access large (semantic) databases with complex actions or other services which are having a response time beyond the threshold. In some cases, the pause between a user interaction and the digital assistant's answer becomes too long and unacceptable. This reduces the flow of the interaction between the user and the digital assistant, and in fine, the usability of the digital assistant.

A purpose of the present invention is to overcome at least one of these drawbacks.

Another purpose of the invention is to propose a solution to reduce the time between a user action and a digital assistant's answer, especially for complicated or unclear actions.

Another purpose of the invention is to propose a solution providing a more fluent interaction with a digital assistant.

BRIEF SUMMARY OF THE INVENTION

The invention makes it possible to achieve at least one of these aims by a computer-implemented method for virtually assisting a user with a digital assistant, comprising at least one iteration of a step, called assisting step, comprising the following steps:
  receiving a user input,
  predicting at least one potential action to be triggered corresponding to said input,
  confirming one of said at least one potential action as the correct action corresponding to said input;
said method also comprising a step, called prefetching step, triggering an execution of at least one potential action before the confirmation step, so that, if said potential action corresponds to the correct action, the response time to said user input is shortened.

In other words, when a user input is not totally clear, or is complicated, so that the digital assistant can't identify the intention the user has, different actions may potentially correspond to said user input/intent, the present invention proposes to partially or totally execute, at least one of the potential actions, and in particular the most likely action as it will be described in greater detail later, before confirming the correct action. Thus, when, after confirmation, the correct action for this user input corresponds to the, or to a, to the executed action, the response to said action may be issued in a shorter time compared to a situation where the execution of the action is triggered after confirmation of the action. On other words, the present invention anticipates the confirmation of the action and executes one or several queries, instead of delaying the execution of the action until it is not confirmed as the correct action.

As a consequence, the present invention reduces the time between a user input and a digital assistant's answer to this user input, especially in case of complicated, or fuzzy, inputs. Thus, thanks to the present invention, the interaction between the user and the digital assistant is more fluent interaction with a digital assistant.

In some embodiments, the step of confirming a potential action may comprise at least one interaction with the user for confirming said potential action as the correct action.

The confirmation may comprise submitting the potential action to the user and asking for confirmation. For example, the potential action may be submitted to the user by a question of the type "Do you mean+[potential action]", or of the type "I understand that you request+[potential action]".

The confirmation may also comprise asking a missing parameter to the user, optionally along with the potential action. For example, the missing parameter may be asked by a sentence like "Please specify+[missing parameter]". In an alternative example, the missing parameter may be asked by a sentence like "If you specify+[missing parameter], I will be able to answer+[potential action]".

In a preferred but not limited embodiment, during the step of confirming a potential action, at least one interaction may be carried out by an audio signal emitted to the user, and especially by speech, i.e. by an intelligible sentence.

Of course, at least one interaction may be carried out in a different fashion, such as for example in written form.

Alternatively, or in addition, the step of confirming a potential action may be carried out as a function of:
  at least one past user input, and/or
  at least one past action, and/or
  at least one response returned in response to a past action, and/or
  at least one contextual data.

In some embodiments, the confirmation step may not comprise an interaction with the user, and the confirmation may be done only as function of at least one of the data listed above.

Of course, in some embodiments the confirmation step may comprise an interaction with the user, and may be carried out as function of at least one of the data listed above. The interaction may complement said data, or may be deducted from said data.

At least one past user input may comprise at least one audio signal associated to a action. According to a general definition, the confirmation may be carried out as a function of conversation flow between the user and the digital assistant. This conversation flow may contain data or parameters to precise the user input, or to confirm the correct action corresponding to the user input.

At least one contextual data may comprise the time of the input, a temperature, a surrounding noise, the location of the user input, etc.

At least one potential action may be, or may comprise, at least one of the following:
executing a function,
loading data,
sending data,
performing a search,
communicating with, or triggering, an equipment,
etc.

According to a general definition, at least one action may be or may comprise any action that may be executed by a digital assistant.

At least one potential action may be predicted as a function of:
a conversation flow between the user and the digital assistant; and/or
a current context.

Indeed the conversation flow may give valuable information about the user's intent. For example, the conversation flow may indicate information or parameters to complement the user's input, when said input is not clear. For example, when user's input is an utterance like "How much is that?", it is nearly impossible to give an answer to this question. But if, in the conversation flow, the user recently asked information about a specific object, such as a new phone that just come out, this information may retrieved automatically and the user input may be complemented in order to get a potential action that may be: "How much is that new phone that just come out?".

Similarly, the context may also give information to precise the user's input when said input is not clear enough for the digital assistant. For example, when the user's input is an utterance like "Call me a cab please", the location of the user is a contextual information that may be retrieved automatically in order to complement the user's input in order to get a potential action that may be "Call me a cab to my office location", if the user is at work.

User input and context information could be captured by video cameras, motion sensors etc., which the user controls consciously or unconsciously. For example, in the example given above, virtual reality (VR) glasses could provide information about which smartphone the user is currently looking at when the user input is "How much is that?" According to a general definition, the context information is comprised of elements from the actual dialogue and direct available data on the current situational context (as described) and from learned situational contexts from the past from the actual user or other users (as neuronal network model or a knowledge-base).

According to a non-limitative preferred embodiment, the predicting step may be carried out by artificial intelligence, for example by a neural network designed and trained beforehand for this function.

According to an advantageous feature, the method according to the invention may further comprise, for at least one potential action, a step for calculating a probability for said potential action, the triggering of the execution of said potential action during the prefetching step depending on said probability.

For example, when the probability associated to a potential action is high enough, for example higher than a first threshold decided beforehand, then the execution of the potential action may be triggered. In the contrary, the potential action may not be executed.

Alternatively, or in addition, when the probability associated to a potential action is high enough, for example higher than a second threshold decided beforehand, the potential action may be executed totally. In the contrary, the potential action may not be executed or only partially executed.

According to another example, when there are several potential actions, the prefetching step may trigger the execution of at least one potential action by begging with the potential action associated to the higher probability.

According to some embodiments, the probability associated to at least one potential action may be determined as a function of:
a conversation flow between the user and the digital assistant; and/or
a current context, for example a current location, a current time, a current temperature, the current work assignments, etc.

For example, in the example given above where the user input is "How much is that?", if the additional information, i.e. the "new phone that has just come out", complementing the user input, is retrieved in the very last user input during the conversation flow, i.e. just before the current input, the probability associated to the potential action "How much is that new phone that just come out?" will be high. In the contrary, the probability associated to the potential action will be lower.

Similarly, in the other example given above where the user input is "Call me a cab please", if the time of the current input corresponds to the time the user usually leaves the office, then the probability associated to the potential action "Call me a cab at my office location" will be high. In the contrary, the probability associated to the potential action will be lower.

According to another advantageous feature, the method according to the invention may further comprise, for at least one potential action, a step determining at least one of the following parameters:
an execution duration, and/or
an execution resource cost;
the triggering of the execution of said potential action during the prefetching step depending on at least one of these parameters.

For example, the prefetching step may trigger the execution of a potential action first, if the execution duration of said potential action is longer than the execution duration of the other potential actions.

Alternatively, or in addition, the prefetching step may decide not to trigger the execution of a potential action if the cost in terms of execution resource associated to said potential action is too high.

According to a preferred embodiment, the prefetching step may trigger, or not, the execution of a potential action as a function of:
the probability,
the execution duration, and
the execution resource cost;
associated to said potential action. The potential action may not be triggered, or may be partially or totally triggered, as a function of these parameters.

In a preferred embodiment, the user input comprises, or is, an audio signal uttered by the user. In this case, the digital assistant may comprise, or may be connected to, an audio signal sensor such as a microphone.

Of course, the invention is not limited to audio inputs.

For example, the user input may be, or may comprise, a written input entered through a user interface such as a keyboard or a touch screen. In this case, the digital assistant may comprise, or may be connected to, said user interface.

According to another example, the user input may also be, or may comprise, a gesture or a movement. In this case, the digital assistant may comprise, or may be connected to, a camera or similar for sensing or detecting said gesture or movement.

According to another aspect of the same invention, it is proposed a computer program comprising instructions which, when executed by a computer, cause the computer to carry out the method according to the invention.

The computer program may be written in any suitable programming language such as C, C++, JAVA, Python, machine language, etc.

According to another aspect of the same invention, it is proposed a data processing device comprising means configured to carry out the steps of the method according to the invention.

The device may be a standalone and dedicated device.

The device according to the invention may be integrated into a digital assistant, or in an equipment provided with a digital assistant.

The device according to the invention may comprise, or may configured to carry out, all the features described above in connection with the method according to the invention. These features are not recalled here for sake of brevity.

In non-limitative embodiments, the device according to the invention may comprise at least one of the following:
  an action predictor configured to predict at least one potential action for a user input;
  a prefetch actuator configured to trigger, or not, the execution of at least one potential action, optionally as a function of a probability, and/or a duration cost or and/or a resource cost associated to said potential action;
  a probability predictor configured to determine the probability associated to a potential action;
  a time predictor configured to determine the duration of the execution of a potential action;
  a cost predictor configured to determine the resources needed for the execution of a potential action; and
  a context manager configured to collect information about the context of the user input.

At least one of these components may be, or may comprise, a hardware component such as a processor, a chip, a memory, etc.

At least one of these components may be, or may comprise, a software component.

At least one of these components may be an individual component, i.e. separated from the other components.

At least one of these components may be integrated with at least another one of these components in a same software or hardware component.

The device according to the invention may be, or may comprise, a digital device, a quantum computer, etc.

According to another aspect of the same invention, it is proposed a digital assistant:
  configured to carry out the steps of the method according to the invention; or
  comprising a device according to the invention.

For example, the digital assistant may comprise the computer program according to the invention.

The digital assistant may be any type of digital assistant used in any type of domain, such as a domestic digital assistant, or a digital assistant used in medical domain, industrial domain, etc.

The digital assistant may be integrated in any type of equipment such as a car, a loudspeaker, a smartphone, a watch, a medical cobot, a manufacturing robot, etc.

BRIEF DESCRIPTION OF THE DRAWINGS

Other advantages and characteristics will become apparent on examination of the detailed description of an embodiment which is in no way limitative, and the attached figures, where.

It is well understood that the embodiments that will be described below are in no way limitative. In particular, it is possible to imagine variants of the invention comprising only a selection of the characteristics described hereinafter, in isolation from the other characteristics described, if this selection of characteristics is sufficient to confer a technical advantage or to differentiate the invention with respect to the state of the prior art. Such a selection comprises at least one, preferably functional, characteristic without structural details, or with only a part of the structural details if this part alone is sufficient to confer a technical advantage or to differentiate the invention with respect to the prior art.

In the figures, elements common to several figures retain the same reference.

DETAILED DESCRIPTION OF THE INVENTION

Figure 1:
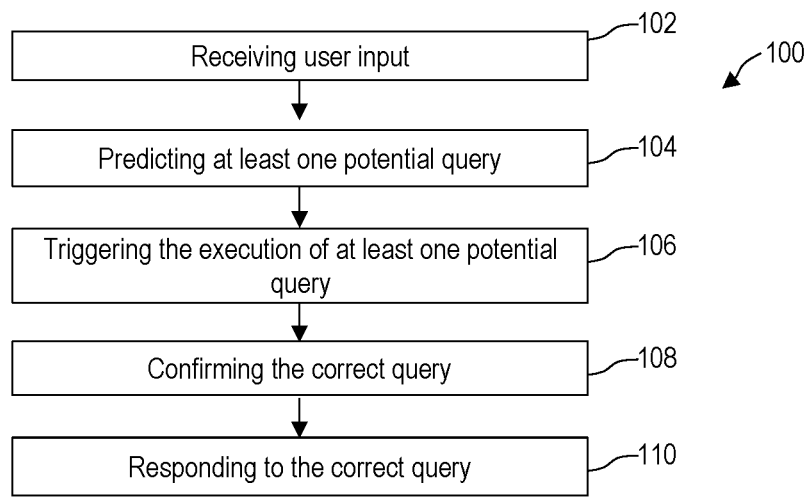
FIG. 1 is a diagrammatic representation of a non-limitative example of a method according to the invention.

FIG. 1 is a schematic representation of a non-limitative example of a method according to the invention.

The method 100, shown in FIG. 1, may be used to assist a user with a digital assistant. The method 100 may be carried out by a digital assistant, or by a device cooperating with a digital assistant without being integrated in a digital assistant. The method 100 comprises a step 102 during which a current user input is received by a digital assistant.

Preferably, the user input is a user utterance.

Alternatively, or in addition, the user input may comprise a gesture or a written entry.

Based on the user input, one or several potential actions corresponding to the said user input are predicted at step 104.

A potential action may be loading data, executing a task or function, starting a machine, delivering the value of a physical parameter, etc.

The prediction of a potential action may be realized as a function of:
  a conversation flow between the user and the digital assistant; and/or
  a current context.

For example, when the current user input is an utterance like "How much is that?", it is nearly impossible to give an answer to this question. But if, in the conversation flow, the user recently asked information about a specific object, such as a new phone that just came out, this information may be retrieved automatically and the user input may be complemented in order to get a potential action that may be: "How much is that new phone that just come out?".

Similarly, the context may also be taken into account. These potential actions are stored.

According to a non-limitative preferred embodiment, the predicting step may be carried out by artificial intelligence, for example by a neural network designed and trained beforehand for this function. The neural network may take as input the current user input and, optionally:
- at least one parameter relating to the context of the current user input; and/or
- at least one parameter relating to the conversation flow.

After the prediction step 104, the method according to the invention comprises a prefetching step 106. The prefetching step triggers the execution of at least one of the potential actions determined at step 104. The execution of a potential action may be partial or total.

At step 108, the correct action corresponding to the current user input is determined.

The determination of the correct action may be carried out by audio or visual interaction with the user.

The interaction with the user may ask for confirmation or additional information. For example, the interaction may issue an audio or visual signal indicating: "If you tell me how much memory you want in your phone I can tell you the price of this phone!" or "If you confirm that you are talking about the new Iphone®, I can tell you the price". Of course, these examples are in no way limitative.

Alternatively, or in addition, the correct action may be determined by analyzing the past conversation flow. For example, if a past action is related to a specific objet, this information may be taken into account to determine the correct action.

Alternatively, or in addition, the correct action may be determined by taking in to account contextual data. For example, if the user input is entered right after a new phone is released, this information may be used to determine the correct action.

If one of the potential actions is determined as being the correct action, the method 100 issues the answer of said action in a shorter time at step 110.

Indeed, since the execution of the potential action corresponding to the correct action has been triggered during the prefetching step 106, the answer for this action is either available after the step 108 or, or obtained in in a shorter time.

Figure 2:
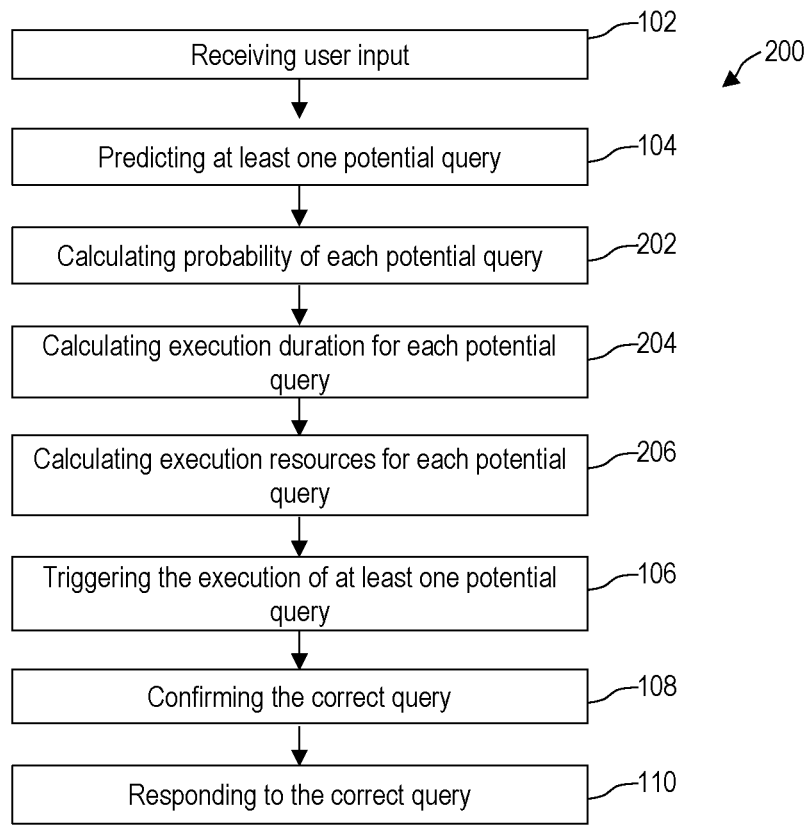
FIG. 2 is a diagrammatic representation of another non-limitative example of a method according to the invention.

FIG. 2 is a schematic representation of another non-limitative example of a method according to the invention.

The method 200 of FIG. 2 comprises all the steps of the method 100 of FIG. 1.

The method 200 further comprises a step 202 determining, for at least one, and especially each, potential action the probability that said potential action corresponds to the correct action, i.e. to the action that matches with the user input.

The probability associated to a potential action may be taken into account at step 106 in order to determine if the execution of this potential action is triggered or not.

For at least one potential action, the probability may be determined as a function of:
- a conversation flow between the user and the digital assistant; and/or
- a current context, for example a current location, a current time, a current temperature, etc.

For example, in the example given above where the user input is "How much is that?", if the additional information, i.e. the "new phone that has just come out", complementing the user input, is retrieved in the very last input during the conversation flow, i.e. just before the current input, the probability associated to the potential action "How much is that new phone that just came out?" will be high. In the contrary, the probability associated to this potential action will be lower.

Similarly, at least one contextual parameter may be taken into account.

The calculation of the probability associated to a potential action may be carried out by artificial intelligence, for example by a neural network designed and trained beforehand for this function. The neural network may take as input:
- at least one parameter relating to the context of the current user input; and/or
- at least one parameter relating to the conversation flow.

The method 200 further comprises a step 204 predicting the execution duration for at least one, especially for each, potential action.

The execution duration associated with a potential action may be taken into account at step 106 in order to determine if the execution of this potential action is triggered or not, or which potential action is triggered first among several potential actions.

For at least one potential action, the execution duration may be determined for example by referring to a knowledge graph, or to a knowledge database, indicating an execution duration for said action. This knowledge graph, or database, may be built beforehand by gathering information about past executions of said action, or similar actions.

The method 200 further comprises a step 206 predicting the amount of resources, called execution cost, needed for executing said action for at least one, especially for each, potential action.

The execution cost associated with a potential action may be taken into account at step 106 in order to determine if the execution of this potential action is triggered or not.

For at least one potential action, the execution cost may be determined for example by referring to a knowledge graph, or to a knowledge database, indicating an execution cost for said action. This knowledge graph, or database, may be built beforehand by gathering information about past executions of said action, or similar actions.

In the example shown in FIG. 2, steps 202, 204 and 206 are represented as separate steps for ease of comprehension.

In alternative embodiments, at least one of these steps may be integrated in a common step with another of these steps.

In alternative embodiments, at least one of these steps may be integrated in step 104.

In step 106, the potential actions to be executed may be selected based on at least one, and especially each, of following parameter:
- the probability associated to said potential actions: for example, if the probability associated to a potential action is too low the execution of this action is not triggered at step 106;
- the execution duration of said actions: for example, if the execution duration of a potential action is too high the execution of this action is not triggered at step 106; and
- the execution cost of said actions: for example, if the execution cost of a potential action is too high the execution of this action is not triggered at step 106

Of course, different rules may be defined to decide when a potential action is executed or not, or an order of execution of several potential actions, based on the parameters listed above.

Figure 3:
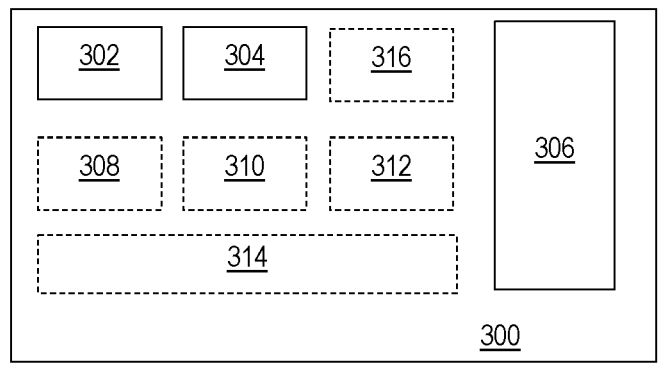
FIG. 3 is a schematic representation of a non-limitative example of a device according to the invention.

FIG. 3 is a schematic representation of a non-limitative example of a device according to the invention.

The device 300, shown in FIG. 3, may be used to assist a user with a digital assistant by carrying out a method according to the invention, for example one of the methods 100 or 200 described above in connection with reference to FIGS. 1 and 2.

The device 300 may be a standalone device or integrated into a digital assistant.

The device 300 may comprise an action predictor 302 configured to predict at least one potential action for a user input. For example, the action predictor 302 may be configured to carry out step 104.

The device 300 may further comprise a confirmation module 304 configured to determine which one of the potential actions correspond to the correct action for this user input. For example, the confirmation module 304 may be configured to carry out step 108.

The device 300 also comprises a prefetch actuator 306 configured to trigger the execution of at least one potential action, optionally as a function of a probability, and/or a duration or and/or an execution cost, associated to said potential action. For example, the prefetch actuator 306 may be configured to carry out step 106.

The device 300 may also optionally comprise:
- a probability predictor 308 configured to determine the probability associated to a potential action;
- a duration predictor 310 configured to determine the duration of the execution of a potential action;
- an execution cost predictor 312 configured to determine the resources needed for the execution of a potential action; and
- a context manager 314 configured to collect information about the context of the user input;
- a context predictor 316 that is configured to estimate whether a context parameter is relevant. Such a context predictor can predict a context from a least two major sources: data regarding the actual dialogue and situational data, and data regarding learned contexts of similar dialogues and similar situational data.

At least one of the components of the device 300 may be, or may comprise, a hardware component such as a processor, a chip, a memory, etc.

At least one of the components of the device 300 may be, or may comprise, a software component.

At least one of the components of the device 300 may be an individual component that is separated from the other components.

At least one of these components of the device 300 may be integrated with at least another one these components in a same software or hardware component.

Figure 4:
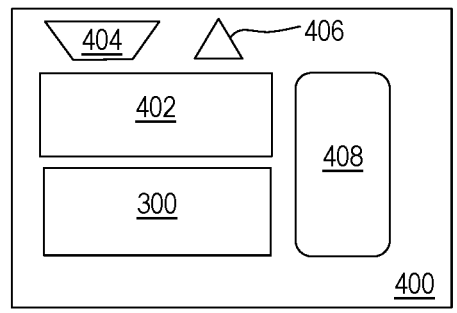
FIG. 4 is a schematic representation of a non-limitative example of a digital assistant according to the invention.

FIG. 4 is a schematic representation of a non-limitative example of a digital assistant according to the invention.

The digital assistant 400, shown in FIG. 4, may be used to assist a user with a digital assistant by carrying out a method according to the invention, for example one of the methods 100 or 200 described above with reference to FIGS. 1 and 2.

In the example of the FIG. 4, the digital assistant 400 comprises the device 300 of FIG. 3.

The digital assistant 400 comprises other components for executing actions, storing data, analysing speech, that are for example integrated in a processor 402.

The digital assistant may also comprise a loudspeaker 404 for issuing audio signals, a microphone 406 for receiving audio signals, and in particular user utterances, etc.

The digital assistant may be dedicated to assisting a user. In other words the digital assistant may not perform any other function that virtually assisting the user.

In the example represented in FIG. 4, the digital assistant 400 comprises at least one other component 408 for carrying out at least one other function such as playing music, driving a car, etc.

The digital assistant 400 may be a standalone apparatus.

Alternatively, the digital assistant 400 may be integrated in an equipment such as a loudspeaker, a smartphone, a watch, a medical cobot, a manufacturing robot, a car, etc.

Of course, the invention is not limited to the examples detailed above.

What is claimed is:

1. A computer-implemented method for virtually assisting a user with a digital assistant comprising at least one iteration of a step, said step comprising an assisting step, said computer-implemented method comprising:
   receiving a user input,
   predicting at least one potential action corresponding to said user input,
   confirming one of said at least one potential action as a correct action corresponding to said user input;
   a prefetching step, said prefetching step comprising triggering execution of said at least one potential action before said confirming, such that, if said at least one potential action corresponds to the correct action, a response time to said user input is shortened,
   wherein for said at least one potential action, determining at least one parameter, said at least one parameter comprising one or more of
   an execution duration,
   a resource cost; and
   wherein the triggering of the execution of said at least one potential action during the prefetching step depends on said at least one parameter.

2. The computer-implemented method according to claim 1, wherein the confirming one of said at least one potential action comprises at least one interaction with the user for confirming said at least one potential action as the correct action.

3. The computer-implemented method according to claim 2, wherein said at least one interaction is carried out by an audio signal emitted to the user.

4. The computer-implemented method according to claim 1, wherein said confirming one of said at least one potential action is carried out as a function of one or more of:
   at least one past user input,
   at least one past action,
   at least one response returned in response to a past action,
   at least one contextual data.

5. The computer-implemented method according to claim 1, wherein said at least one potential action is predicted as a function of one or more of:
   a conversation flow between the user and the digital assistant;
   a current context.

6. The computer-implemented method according to claim 1, further comprising, for said at least one potential action, calculating a probability for said at least one potential action, wherein the triggering of the execution of said at least one potential action during the prefetching step depends on said probability.

7. The computer-implemented method according to claim 6, wherein the probability associated with said at least one potential action is determined as a function of one or more of: a conversation flow between the user and the digital assistant; and/or a current context.

8. The computer-implemented method according to claim 1, wherein the user input comprises, or is, an audio signal uttered by the user.

9. A non-transitory computer program comprising instructions which, when executed by a computer, cause the computer to carry out a computer-implemented method for virtually assisting a user with a digital assistant comprising at least one iteration of a step, said step comprising an assisting step, said computer-implemented method comprising:

receiving a user input, predicting at least one potential action corresponding to said user input, confirming one of said at least one potential action as a correct action corresponding to said user input;

a prefetching step, said prefetching step comprising triggering execution of said at least one potential action before said confirming, such that, if said at least one potential action corresponds to the correct action, a response time to said user input is shortened, wherein for said at least one potential action, determining at least one parameter, said at least one parameter comprising one or more of an execution duration, a resource cost; and wherein the triggering of the execution of said at least one potential action during the prefetching step depends on said at least one parameter.

10. A data processing device or digital assistant comprising:

means configured to carry out a computer-implemented method for virtually assisting a user with a digital assistant comprising at least one iteration of a step, said step comprising an assisting step, said computer-implemented method comprising:

receiving a user input, predicting at least one potential action corresponding to said user input, confirming one of said at least one potential action as a correct action corresponding to said user input;

a prefetching step, said prefetching step comprising triggering execution of said at least one potential action before said confirming, such that, if said at least one potential action corresponds to the correct action, a response time to said user input is shortened, wherein for said at least one potential action, determining at least one parameter, said at least one parameter comprising one or more of an execution duration, a resource cost; and wherein the triggering of the execution of said at least one potential action during the prefetching step depends on said at least one parameter.

* * * * *